United States Patent
Blazer et al.

(10) Patent No.: US 12,050,353 B2
(45) Date of Patent: Jul. 30, 2024

(54) OPTICAL FIBER CABLE HAVING BUFFER COUPLED TO ARMOR USING WATER-BLOCK ADHESIVE AND METHOD

(71) Applicant: CORNING RESEARCH & DEVELOPMENT CORPORATION, Corning, NY (US)

(72) Inventors: Bradley Jerome Blazer, Granite Falls, NC (US); Yangbin Chen, Lake Elmo, MN (US); Allen Michael Miller, Lenoir, NC (US); Christopher Mark Quinn, Hickory, NC (US); Randy Curtis Smith, Lincolnton, NC (US)

(73) Assignee: CORNING RESEARCH AND DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/315,550

(22) Filed: May 10, 2021

(65) Prior Publication Data
US 2021/0263256 A1    Aug. 26, 2021

Related U.S. Application Data

(63) Continuation of application No. PCT/US2019/060984, filed on Nov. 12, 2019.
(Continued)

(51) Int. Cl.
*G02B 6/44* (2006.01)
(52) U.S. Cl.
CPC ....... *G02B 6/44384* (2023.05); *G02B 6/4486* (2013.01)

(58) Field of Classification Search
CPC ............................ G02B 6/4494; G02B 6/4486
See application file for complete search history.

(56) References Cited

U.S. PATENT DOCUMENTS

6,167,179 A    12/2000  Weiss et al.
6,198,865 B1    3/2001  Risch
(Continued)

OTHER PUBLICATIONS

International Search Report and Written Opinion of the International Searching Authority; PCT/US2019/060984; Mailed on Jan. 30, 2020, 10 pages; European Patent Office.
(Continued)

*Primary Examiner* — Sung H Pak
*Assistant Examiner* — Hoang Q Tran
(74) *Attorney, Agent, or Firm* — Thomas R. Irwin

(57) ABSTRACT

Embodiments of the disclosure relate to an optical fiber cable. The optical fiber cable includes a cable jacket having a first inner surface and a first outer surface. The first inner surface defines a central bore along a longitudinal axis of the optical fiber cable. The optical fiber cable also includes optical fibers disposed within the central bore and a buffer tube surrounding the optical fibers. The buffer tube has a second inner surface and a second outer surface. The optical fiber cable also includes an armor layer disposed between the first inner surface of the cable jacket and the second outer surface of the buffer tube and a water-blocking adhesive disposed between the armor layer and the first outer surface of the buffer tube. The water-blocking adhesive extends along the longitudinal axis of the optical fiber cable and around a circumference of the buffer tube.

20 Claims, 4 Drawing Sheets

Related U.S. Application Data

(60) Provisional application No. 62/770,350, filed on Nov. 21, 2018.

(56) References Cited

U.S. PATENT DOCUMENTS

| | | |
|---|---|---|
| 6,459,837 B1 | 10/2002 | Fitz et al. |
| 8,577,196 B1 | 11/2013 | McNutt |
| 8,639,075 B1 | 1/2014 | Burnett |
| 9,140,867 B1 * | 9/2015 | Sandate Aguilar ......................... G02B 6/44384 |
| 9,415,551 B2 | 8/2016 | Gimblet et al. |
| 2003/0152350 A1 | 8/2003 | Konda et al. |
| 2004/0223707 A1 | 11/2004 | Parsons et al. |
| 2004/0234215 A1 | 11/2004 | Serrano et al. |
| 2004/0258372 A1 | 12/2004 | Risch et al. |
| 2008/0056649 A1 * | 3/2008 | Fulbright ............. G02B 6/4432 385/100 |
| 2009/0074365 A1 | 3/2009 | Martin |
| 2009/0274426 A1 | 11/2009 | Lail |
| 2015/0104570 A1 | 4/2015 | Blazer et al. |
| 2015/0177471 A1 * | 6/2015 | Bringuier ............. G02B 6/4494 385/103 |
| 2016/0306130 A1 | 10/2016 | Bringuier et al. |
| 2017/0146757 A1 | 5/2017 | Blazer et al. |

OTHER PUBLICATIONS

European Patent Application No. 19886972.9, Extended European search report, dated Jun. 23, 2022; 09 pages; European Patent Office.

* cited by examiner

OPTICAL FIBER CABLE HAVING BUFFER COUPLED TO ARMOR USING WATER-BLOCK ADHESIVE AND METHOD

CROSS-REFERENCE TO RELATED APPLICATIONS

This application is a continuation of International Application No. PCT/US2019/060984 filed on Nov. 12, 2019, which claims the benefit of priority under 35 U.S.C. § 119 of U.S. Provisional Application Ser. No. 62/770,350 filed on Nov. 21, 2018, the content of each of which is relied upon and incorporated herein by reference in their entirety.

BACKGROUND

The present invention is related to optical fiber cables and more particularly to optical fiber cables that have a buffer tube coupled to an armor layer to prevent shrinkage of the buffer tube during temperature cycling. Optical fiber cables are used to transmit data over distance. Generally, large distribution cables that carry a multitude of optical fibers from a hub are sub-divided at network nodes, which are further sub-divided, e.g., to the premises of individual subscribers. The cables making up these subdivisions are carried through the distribution network on utility poles or are buried underground. In either case, the cables may be exposed to temperature extremes that the cable must be able to withstand in order to reliability transmit data in the distribution network.

SUMMARY

In one aspect, embodiments of the disclosure relate to an optical fiber cable. The optical fiber cable includes a cable jacket having a first inner surface and a first outer surface. The first inner surface defines a central bore along a longitudinal axis of the optical fiber cable. The first outer surface defines the outermost surface of the optical fiber cable. The optical fiber cable also includes at least one optical fiber disposed within the central bore and a buffer tube disposed within the central bore and surrounding the at least one optical fiber along the longitudinal axis. The buffer tube has a second inner surface and a second outer surface. The optical fiber cable also includes an armor layer disposed between the first inner surface of the cable jacket and the second outer surface of the buffer tube and a water-blocking adhesive disposed between the armor layer and the first outer surface of the buffer tube. The water-blocking adhesive extends along at least a portion of the longitudinal axis of the optical fiber cable and at least partially around a circumference of the buffer tube.

In another aspect, embodiments of the disclosure relate to a method of preparing an optical fiber cable. In the method, an optical fiber cable core is provided. The optical fiber cable core includes a buffer tube and at least one optical fiber. The buffer tube has an inner surface and an outer surface. The inner surface defines a central bore along a longitudinal axis of the optical fiber cable core. The at least one optical fiber is disposed within the central bore. In the method, an armor layer is formed partially around the optical fiber cable core. Water-blocking adhesive is applied on at least one of the cable core or the armor layer. The armor layer is closed around the optical fiber cable core.

In yet another aspect, embodiments of the disclosure relate to an optical fiber cable. The optical fiber cable includes a jacket structure having a cable jacket. The jacket structure defines a central bore along a longitudinal axis of the optical fiber cable. The optical fiber cable also includes at least one optical fiber disposed within the central bore and a first layer disposed between the at least one optical fiber and the jacket structure. Still further, the optical fiber cable includes a second layer disposed between the first layer and the jacket structure. The second layer adheres the first layer to the jacket structure, and the second layer is configured to absorb water that passes through the jacket structure.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of an optical fiber cable are disclosed in which an armor layer is coupled to a cable core using a water-blocking adhesive, such as a superabsorbent polymer (SAP) hot melt. In an optical fiber cable, the buffer tube has a relatively high coefficient of thermal expansion as compared to the jacket structure (i.e., cable jacket, strength members, and armor layer) of the optical fiber cable, which means that the buffer tube will contract more extensively than the jacket structure during temperature cycling. In certain situations, such as when an end of the optical fiber cable is terminated in a splice enclosure, the thermal contraction of the buffer tube may cause the optical fibers to be pulled out of the splice enclosure. As disclosed herein, the buffer tube in an optical fiber cable is coupled to the jacket structure, which has a much lower CTE, so that the shrinkage of the buffer tube is limited. These aspects and advantages will be discussed in greater detail with respect to the following exemplary embodiments. These embodiments are provided for the purpose of illustration and should not be read as limiting.

Figure 1:
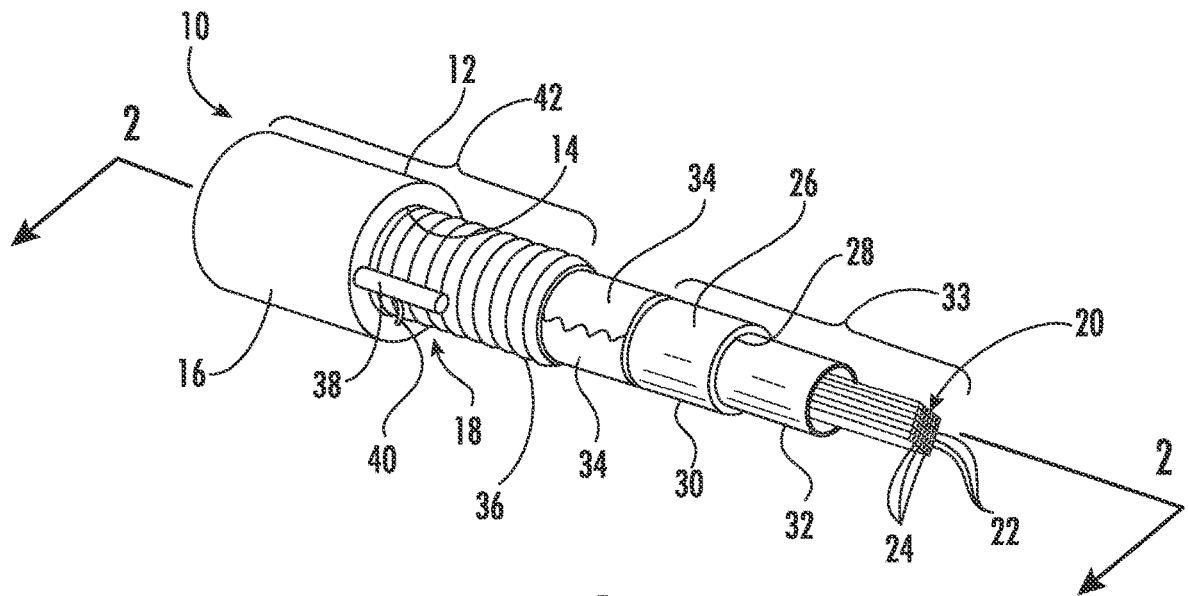
FIG. 1 depicts an optical fiber cable, according to an exemplary embodiment.

FIG. 1 depicts an embodiment of an optical fiber cable 10. The optical fiber cable 10 includes a cable jacket 12 having an inner surface 14 and an outer surface 16. The outer surface 16 defines an outermost surface of the optical fiber cable 10. The inner surface 14 of the cable jacket 12 defines a longitudinal bore 18. Disposed within the bore 18 are optical communication elements. In the embodiment depicted, the optical communication elements include a stack 20 of optical fiber ribbons 22. Each optical fiber ribbon 22 includes a plurality of optical fibers 24 arranged in a planar configuration and bound together, e.g., with a matrix material. In embodiments, the stack 20 includes, e.g., from one to thirty-two optical fiber ribbons 22. In embodiments, each optical fiber ribbon 22 includes from four to thirty-six optical fibers 24. Thus, in embodiments, the optical fiber cable 10 may include, e.g., anywhere from four to 576 optical fibers 24 in the bore 18. In other embodiments, the optical fibers 24 may be in a loose-tube configuration or arranged in a plurality of buffer tubes, e.g., wound around a central strength member.

In the embodiment depicted in FIG. 1, the stack 20 of optical fiber ribbons 22 are contained in a buffer tube 26. The buffer tube 26 has an interior surface 28 and an exterior surface 30. In embodiments, disposed on the interior surface 28 and/or wrapped around the stack 20 is a water barrier layer 32 that prevents or limits water from contacting the optical fiber ribbons 22. In embodiments, the water barrier layer 32 is a water-blocking tape, e.g., that absorbs water and/or swells when contacted with water. In other embodiments, the water barrier layer 32 is an SAP powder applied to the exterior of the stack 20 and/or the inner surface 28 of the buffer tube 26. As used herein, all of the components from the buffer tube 26 inward are referred to as the "cable core" 33.

As shown in FIG. 1, a layer or strips of water-blocking adhesive 34 are applied along at least a portion of the cable 33. In the embodiment depicted in FIG. 1, the water-blocking adhesive 34 adheres an armor layer 36 to the buffer tube 26. In embodiments, the armor layer 36 is corrugated. In embodiments, the corrugated armor layer 36 includes twelve to fourteen corrugations 37 per inch, and in embodiments, the corrugations 37 each have a corrugation height of twenty-five to thirty mils. In embodiments, the water-blocking adhesive 34 is foamed, which enhances the volume-filling effect of the water-blocking adhesive 34 (e.g., especially into the corrugations 37 of the armor layer 36). The optical fiber cable 10 may include other components, such as longitudinal strength members 38 and/or preferential access features 40, such as a ripcord. The components of the optical fiber cable 10 outside of the water-blocking adhesive 34 (e.g., the cable jacket 12, the armor layer 36, and the strength members 38 in the embodiment of FIG. 1) are referred to as the "jacket structure" 42. The components of the jacket structure 42 are closely coupled (i.e., the cable jacket 12 is extruded around the armor layer 36 and the strength members 38 are embedded in the cable jacket 12), which means that these components contract during thermal cycling effectively the same amount.

As disclosed herein, the water-blocking adhesive 34 helps prevent the shrinkage of the buffer tube 26 when the optical fiber cable 10 is exposed to temperature cycling by coupling the buffer tube 26 to the jacket structure 42. In a typical installation, an optical fiber cable 10 is spliced at various locations in the cable distribution network. These splices are often contained in an enclosure, which may be suspended in the air from a utility pole or buried underground. In any case, the splice enclosure may be subject to extreme temperatures. In particular, extremely cold temperatures may cause the buffer tube 26 to contract, which in some circumstances, may pull the ribbons 22 from the splice enclosure. The contraction of the buffer tube 26 is attributed to the relatively high coefficient of thermal expansion (CTE) of the buffer tube material, which may be at least one of high density polyethylene (HDPE), low density polyethylene (LDPE), medium density polyethylene (MDPE), polypropylene (PP), polyvinyl chloride (PVC), polyvinylidene difluoride (PVDF), polyamides, polyesters, or polycarbonate and their copolymers. In general, the CTE of the buffer tube material is between about 90 μm/mK to 130 μm/mK. As shown in Table 1, below, the CTE of the buffer tube material can cause significant shrink back forces to be generated.

TABLE 1

Buffer Tube Shrink Force at −40° C.

| Fiber Count | Area (mm$^2$) | Shrink back force @ −40° C. | |
| --- | --- | --- | --- |
| | | (N) | (lb) |
| 12 | 11.1 | 142 | 32 |
| 24 | 11.1 | 142 | 32 |
| 36 | 9.4 | 121 | 27 |
| 48 | 9.4 | 121 | 27 |
| 60 | 29.4 | 376 | 85 |
| 72 | 12.2 | 157 | 35 |
| 96 | 13.9 | 177 | 40 |
| 144 | 16.1 | 206 | 46 |
| 288 | 55.8 | 714 | 160 |

In Table 1, the area is the cross-sectional area of the buffer tube 26 between the inner surface 28 and the outer surface 30. The shrink back forces in Table 1 correspond to the predicted maximum axial force extrapolated from measurements of buffer tube shrink back stress. To perform the measurements, sections of buffer tubes of a variety of sizes, jacketed and unjacketed, dry-filled, and gel-filled were held at a constant length while exposing the buffer tube to temperatures of −40° C. The maximum stress measured among all the sections was 12.8 MPa. Thus, the shrink back forces in Table 1 equal the measured area multiplied by the maximum measured stress.

In the optical fiber cable 10, the jacket structure 42 (i.e., cable jacket 12, armor layer 36, and strength members 38) has an effective CTE of about 20 μm/mK to about 50 μm/mK. Accordingly, when exposed to temperature cycling, the jacket structure 42 shrinks much less than the buffer tube 26. Thus, as disclosed herein, the water-blocking adhesive 34 adheres the buffer tube 26 and to the armor layer 36 so that the buffer tube 26 is prevented from shrinking back when exposed to temperature cycling. Further, in embodiments in which the water-blocking adhesive 34 extends in a layer circumferentially around the cable core 33, the armor layer 36 exerts radial compressive stresses on the cable core 33, which also helps prevent the buffer tube from shrinking back.

Figure 2:
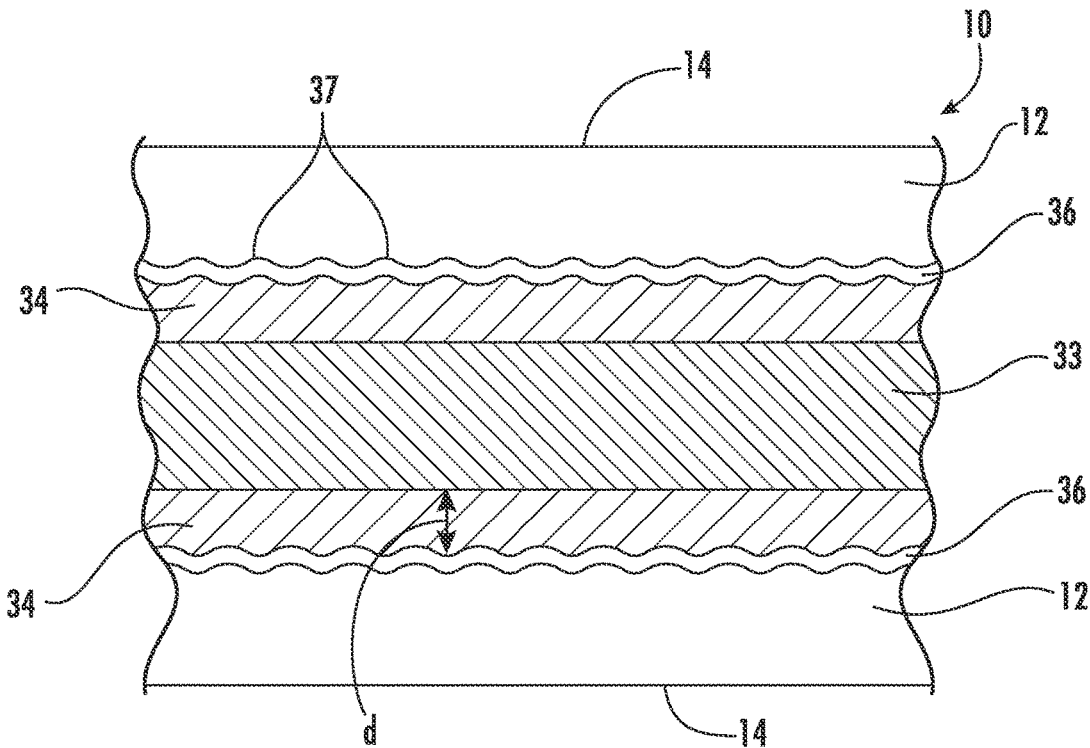
FIG. 2 depicts a cross-sectional view of the optical fiber cable of FIG. 1, according to an exemplary embodiment.

Besides the adhesive bonding and radial compressive stresses between the buffer tube 26 and the armor layer 36, a mechanical interlock may also be formed when the armor layer 36 includes corrugations. As shown in the cross-section of FIG. 2, the water-blocking adhesive 34 fills the corrugations of the armor layer 26, which also prevents the buffer tube 26 from shrinking within the armor layer 26. In embodiments, the water-blocking adhesive 34 fills a distance d between the cable core 33 and armor layer 36 of up to 0.8 mm. It is noted that the depiction shown in FIG. 2 is not to scale, and the distance between the cable core 33 and armor layer 36 is exaggerated relative to the dimensions of the other components depicted in FIG. 2.

Figure 5:
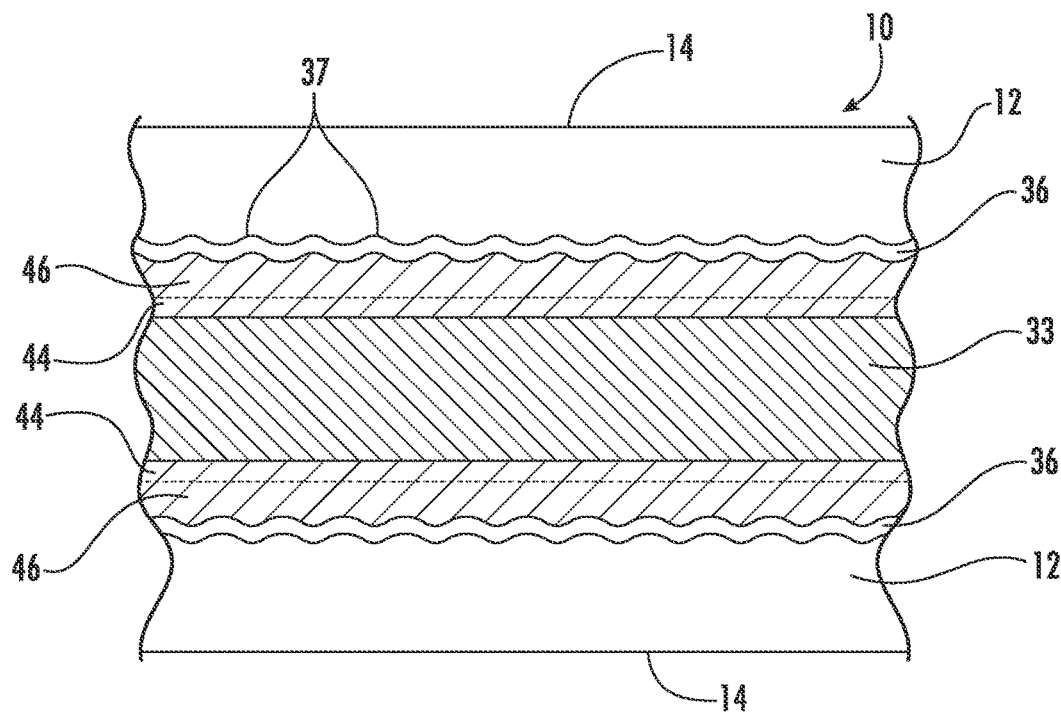
FIG. 5 depicts another cross-sectional view of an optical fiber cable having a water-blocking tape embedded in an adhesive, according to an exemplary embodiment.

Further, in the embodiment shown in FIG. 5, a layer of water-blocking tape or yarns 44 (shown in dashed lines) is embedded in an adhesive 46 that may not have water-blocking capabilities. In particular, the water-blocking tape or yarns 44 may be wrapped around the outer surface 30 of the buffer tube 26. Thereafter, the adhesive 46 is applied, in particular in liquid form, which permeates that water-blocking tape or yarns 44, creating a coupling between the buffer tube 26 and the water-blocking tape or yarns 44. In this way, the combination of the water-blocking tape or yarns 44 and adhesive 46 fulfills the functions of the water-blocking adhesive 34 of the embodiment shown in FIG. 2.

Advantageously, an optical fiber cable 10 having a water-blocking adhesive 34 (or an adhesive 46 with embedded water-blocking tapes or yarns 44) filling at least a portion of the space between the buffer tube 26 and armor layer 36 along the longitudinal axis of the optical fiber cable 10 experiences significantly less buffer tube shrinkage as compared to conventional optical fiber cables. The shrinkage of conventional optical fiber cables as compared to embodiments of the disclosed optical fiber cable 10 was investigated. A six-meter length of a conventional optical fiber cable and of the presently disclosed optical fiber cable 10 were each exposed to following conditions: 57 cycles of −40° C. to −70° C., aging for 1 week at 70° ° C., and 29 cycles of −40° C. to 23° C. After exposure to these conditions, the conventional optical fiber cable experienced a buffer tube shrinkage of 3.58% or 215 mm. The disclosed optical fiber cable 10 experienced a buffer tube shrinkage of only 0.17% or 10 mm. In embodiments, the optical fiber cable 10 experiences a buffer tube shrinkage of less than 75 mm regardless of length. In further embodiments, the optical fiber cable 10 experiences a buffer tube shrinkage of less than 50 mm regardless of length, and in still other embodiments, the optical fiber cable 10 experiences a buffer tube shrinkage of less than 25 mm regardless of length.

Conventional optical fiber cables often are installed at splice enclosures with slack coils, which provide coupling of the cable components to prevent axial motion of the components relative to each other. However, besides being a waste of optical fiber cable, the slack coils are generally not considered aesthetically pleasing in an installation. Advantageously, embodiments of the optical fiber cable 10 are able to be installed at splice enclosures without requiring the use of slack coils.

In another embodiment, the optical fiber cable 10 is a dielectric cable that does not contain an armor layer 36. In such an embodiment, the buffer tube 26 is coupled to the jacket structure 42 with the water-blocking adhesive 34 (or an adhesive 46 with embedded water-blocking tape or yarns 44). In such embodiments, the water-blocking adhesive 34 (or adhesive 46) may adhere to the inner surface 14 of the cable jacket 12 and to the outer surface 30 of the buffer tube 26. In such an embodiment, the jacket structure 42 may have a much lower effective CTE than the buffer tube 26 by virtue of the embedded strength members 38, such as glass-reinforced plastic rods or strengthening yarns (e.g., yarns made of aramid, glass, carbon, and/or cotton fibers).

Figure 6:
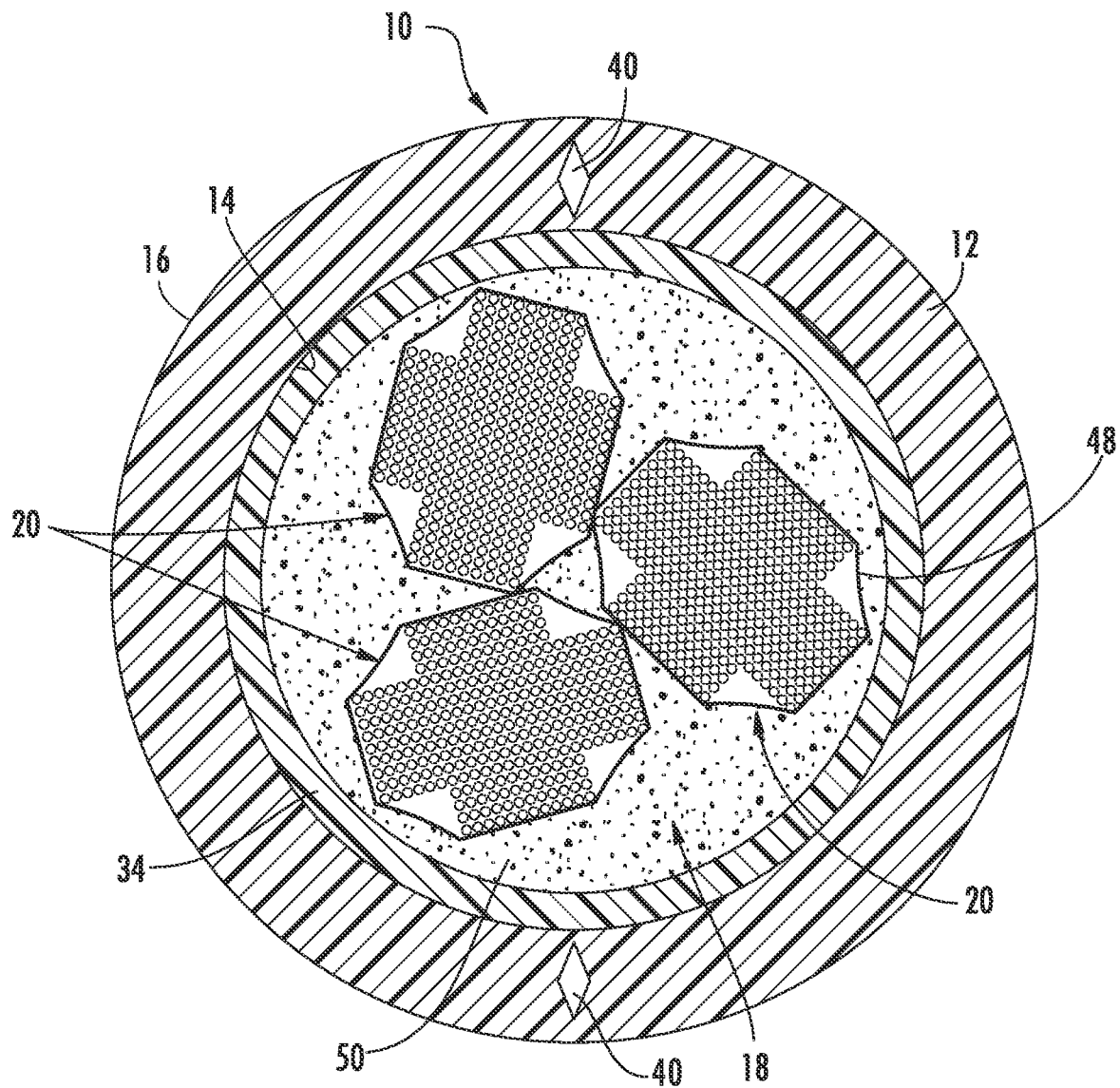
FIG. 6 depicts a cross-sectional view of an optical fiber cable having multiple stacks of optical fiber ribbons disposed in a foamed thermoplastic elastomer, according to an exemplary embodiment.

FIG. 6 depicts another embodiment of an optical fiber ribbon 10 in which the stacks 20 having optical fiber ribbons 22 with different numbers of optical fibers 24 contained in each ribbon 22. In particular, the stacks 20 include an upper and lower section having less optical fiber 24 than a middle section. In embodiments, the upper and lower sections each include four ribbons 22 of twelve optical fibers 24 and the middle section includes eight ribbons 22 of twenty-four optical fibers 24 for a total of 288 optical fibers 24 per stack 20. The ribbons 22 are held in the stack 20 with a wrap 48. In the embodiment of FIG. 6, the optical fiber cable 10 includes three stacks 20 for a total of 864 optical fibers 24, but in other embodiments, the optical fiber cable 10 may include, e.g., up to twelve stacks 20 for a total of 3456 optical fibers 24 in the optical fiber cable 10. The stacks 20 are contained in the central bore 18 of the optical fiber cable 10 and held in place by foamed thermoplastic elastomer (TPE) 50 disposed within the central bore 18 around the stacks 20. In embodiments, the water-blocking adhesive 34 (or adhesive 46 with embedded water-blocking tape or yarns 44) is applied around the foamed TPE 50 and adheres the foamed TPE 50 to the inner surface 14 of the cable jacket 12. In embodiments, an armor layer (not shown) may also be provided on the inner surface 14 of the cable jacket 12, and the water-blocking adhesive 34 (or adhesive 46) may adhere the foamed TPE 50 to the armor layer.

Figure 3:
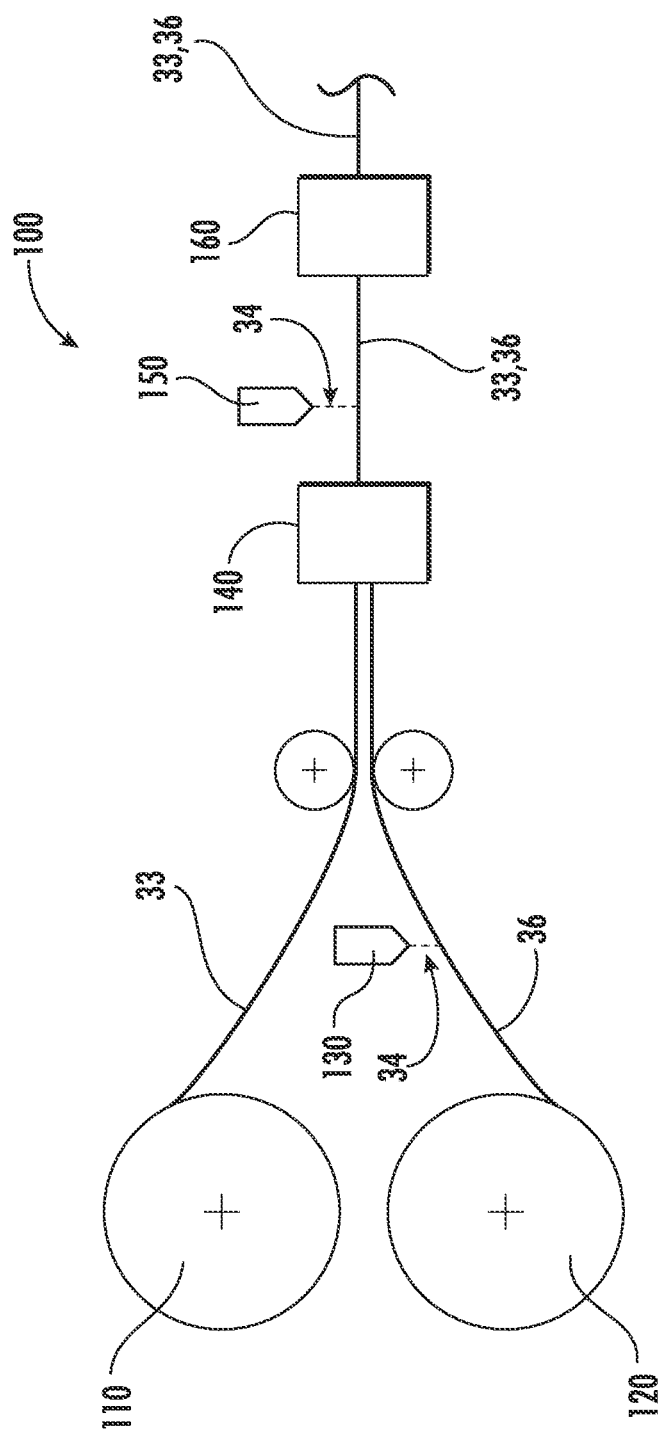
FIG. 3 is a partial schematic depiction of a processing line for manufacturing an optical fiber cable, according to an exemplary embodiment.

FIG. 3 provides a schematic depiction of a processing line 100 for applying the water-blocking adhesive 34 to the cable core 33. As shown in FIG. 3, a length of cable core 33 is provided on a first payoff reel 110, and a spool of metal tape for the armor layer 36 is provided on a second payoff reel 120. Both the cable core 33 and the armor layer 36 are fed onto the processing line 100 so that the armor layer 36 can be wrapped around the cable core 33. In an embodiment, the water-blocking adhesive 34 is applied to the armor layer 36 prior to being wrapped around the cable core 33. In an embodiment, the metal tape is provided in an uncorrugated roll, and the flat metal tape is passed through corrugating rollers prior to beign wrapped around the cable core 33. Optionally, after any corrugations are formed into the armor layer 36 and as shown in FIG. 3, the water-blocking adhesive 34 can be applied to the armor layer 36 via a first nozzle 130. The cable core 33 and the armor layer 36 (with or without water-blocking adhesive 34) are fed into a first former 140. The first former 140 bends the armor layer 36 into a U-shape around the cable core 33. Thereafter, the cable core 33 and armor layer 36 pass under a second nozzle 150. The second nozzle 150 applies a strip of water-blocking adhesive 34 to the cable core 33. In embodiments, the water-blocking adhesive 34 is applied intermittently or discontinuously along the length of the cable core 33. Further, the nozzles 130, 150 can be used in conjunction with a mechanical or air spreading device to provide a uniform coating of the water-blocking adhesive 34.

After applying the water-blocking adhesive 34, the cable core 33 and armor layer 36 pass through a second former 160 that closes the armor layer 36 around the cable core 33. The closing of the armor layer 36 around the cable core 33 cause the water-blocking adhesive 34 to spread partially or totally around the circumference of the cable core 33. After exiting the second former 160, the cable core 33 and armor layer 36 continue to downstream processing, such as extruding of the cable jacket 12 around the armor layer 36.

Figure 4:
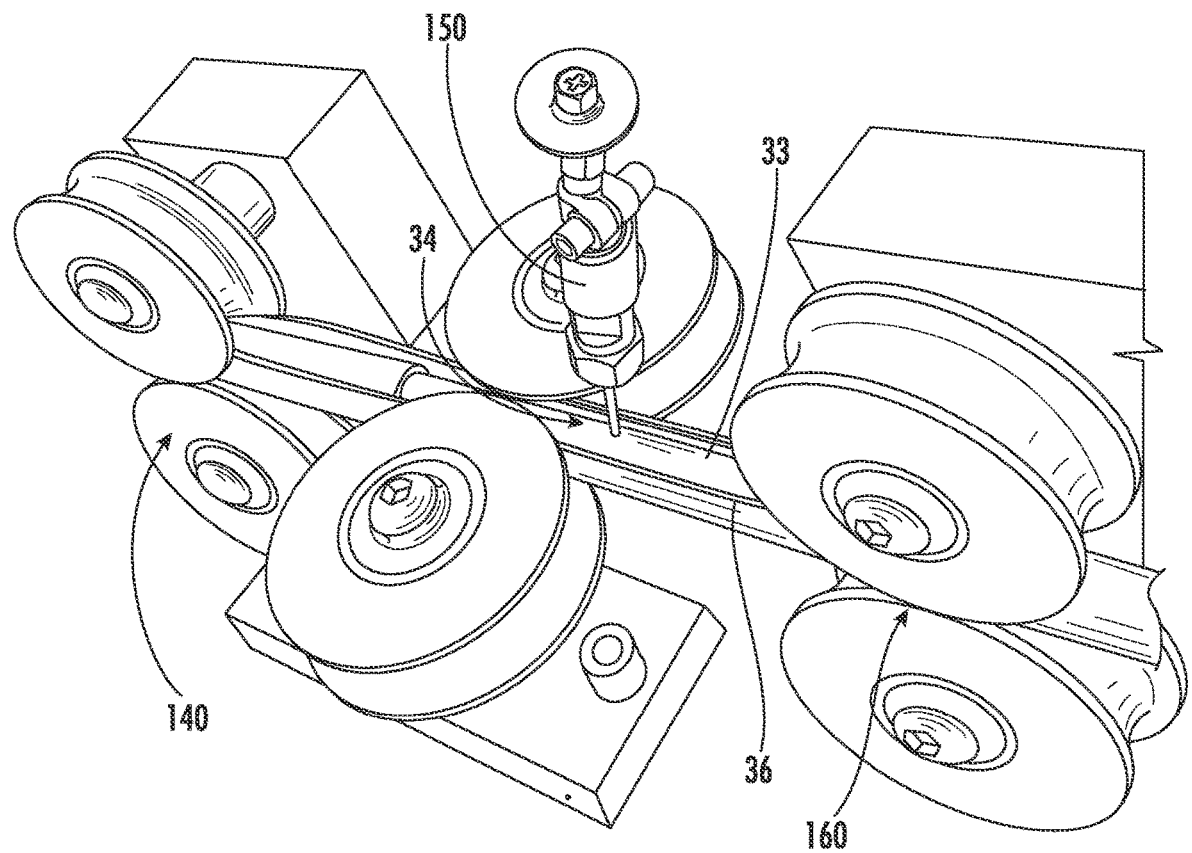
FIG. 4 depicts a nozzle on the manufacturing line of FIG. 3 applying liquid superabsorbent polymer adhesive to a cable core, according to an exemplary embodiment.

FIG. 4 provides a detail view of the cable core 33 and armor layer 36 in the section of the processing line 100 between the first former 140 and the second former 160. As can be seen, the second nozzle 150 deposits the water-blocking adhesive 34 onto the cable core 33. The armor layer 36, which has been formed into a U-shape, acts as a trough to catch water-blocking adhesive 34 that flows around the cable core 33.

In some embodiments, the water-blocking adhesive 34 used are physically setting thermoplastic materials. For example, these may include commercially available water-swellable hot melt adhesives such as HM002 and HM008B (available from Stewart Superabsorbents, Hickory, NC), Technomelt AS 4415 (also known as Macromelt Q 4415 available from Henkel Corp., Madison Heights, MI), and NW1117 and NW1120B (Hydrolock R super absorbent thermoplastic available from H. B. Fuller Company, Vadnais Heights, MN).

Additionally, a variety of exemplary compositions are provided in the following paragraphs. According to one embodiment, the water-blocking adhesive 34 includes essentially three components that are mixed homogenously. The first component is a water-insoluble component containing at least one water-insoluble polymer or copolymer and at least one other substantially water-insoluble resin. For example, the first component can be selected from polyamides, copolyamides, polyaminoamides, polyesters, polyacrylates, polymethacrylates, polyolefins and ethylene/vinyl acetate (EVA) copolymers. Further the first component can be mixtures of one or more of the foregoing polymers. The second component is a water-soluble or water-dispersible component containing at least one water-soluble or water-dispersible oligomer and/or polymer or copolymer. For example, the second component can be selected from polyethylene glycols with molecular weights of 400 to 20,000, polyvinyl methyl ether, polyvinyl pyrrolidone, copolymers of vinyl methyl ether or vinyl pyrrolidone, polyvinyl alcohols, water-soluble or water-dispersible polyesters or copolyesters, and water-soluble or water-dispersible acrylate polymers.

The third component is a water-swellable component (e.g., a superabsorbent polymer) consisting of a water-swellable homopolymer or copolymer. For example, the third component can be selected from any homopolymers and/or copolymers which, as hydrophilic materials, are capable of absorbing and retaining large amounts of water, even under pressure, without immediately dissolving in the water, including, for example, graft copolymers of starch or cellulose with acrylonitrile, acrylic acid or acrylamide, carboxymethyl cellulose, maleic anhydride/poly-α-olefin copolymers, polyacrylamide, polyacrylic acid and salts of polyacrylic acid, and, optionally, copolymers of acrylic acid or acrylamide with acrylate esters. In embodiments, other suitable the third components include homopolymers and copolymers of acrylic acid or methacrylic acid, acrylonitrile or methacrylonitrile, acrylamide or methacrylamide, vinyl acetate, vinyl pyrrolidone, maleic acid, maleic anhydride, itaconic acid, itaconic anhydride, vinyl sulfonic acid or hydroxyalkyl esters of such acids, 0 to 95% by weight of the acid groups being neutralized with alkali or ammonium groups and these polymers/copolymers are crosslinked by means of polyfunctional compounds. Graft copolymers of starch or cellulose with the above comonomers can also be used in certain embodiments. Still other suitable superabsorbent polymers include crosslinked acrylate polymers, crosslinked products of vinyl alcohol-acrylate copolymers, crosslinked products of polyvinyl alcohols grafted with maleic anhydride, cross-linked products of acrylate-methacrylate copolymers, crosslinked saponification products of methyl acrylate-vinyl acetate copolymers, crosslinked products of starch acrylate graft copolymers, crosslinked saponification products of starch acrylonitrile graft copolymers, crosslinked products of carboxymethyl cellulose polymers, and crosslinked products of isobutylene-maleic anhydride copolymers.

In some embodiments, the water-blocking adhesive 34 also includes a tackifying resin or resins to increase the tackiness of the melt. In particular embodiments, various colophony derivatives, i.e., in particular the resin esters of abietic acid, are used for the tackifying resin: although, in other embodiments, other polyterpenes and terpene/phenol resins are used. Other colophony derivatives include colophony esters of various mono- and poly-functional alcohols. Additionally, suitable tackifying resins include wood rosin, tall oil rosin, tall oil derivatives, gum rosin, rosin ester resins, natural terpenes, synthetic terpenes, and petroleum based tackifying agents, including, e.g., aliphatic, aromatic and mixed aliphatic-aromatic petroleum based tackifying resins. Still further, other suitable tackifying resins include, e.g., alpha-methyl styrene resins, branched and unbranched $C_5$ resins, $C_9$ resins and $C_{10}$ resins, styrenic and hydrogenated modifications thereof, and combinations thereof.

In particular embodiments, the water-blocking adhesive 34 contains the following components: 15 to 45% by weight of resin esters or terpene/phenol resins: 15 to 40% by weight of thermoplastic copolymer, more particularly ethylene/vinyl acetate copolymer: 5 to 20% by weight of acrylate copolymers: 5 to 30% by weight of polyethylene glycols: 5 to 15% by weight of polyvinyl ethyl ethers, water-soluble or water-dispersible acrylate polymers or water-soluble or water-dispersible copolyesters: 15 to 50% by weight of powder-form polyacrylic acid salt, polyacrylamide or similar powdered superabsorbent polymer: and 0.2 to 2.0% by weight of stabilizers, such as, for example, antioxidants based on sterically hindered phenols, that enhance the temperature stability of the compositions.

In other particular embodiments, the water-blocking adhesive 34 contains the following components: 15 to 45% by weight of resin esters, terpene/phenol resins or the like: 15 to 40% by weight of thermoplastic polymer or copolymer, more particularly ethylene/vinyl acetate copolymer: 5 to 25% by weight of polyethylene glycols: 15 to 50% by weight of a powdered superabsorbent polymer, more particularly polyacrylic acid salt: 0.2 to 2.0% by weight of a stabilizer: and 0.5 to 5.0% by weight of waxes, more particularly ethylene bis-stearamide.

In another embodiment of a suitable water-blocking adhesive 34 composition, the water-blocking adhesive 34 is comprised of 10 to 25% by weight of at least one tackifying resin, 20 to 40% by weight of at least one water-dispersible EVA wax, 5 to 25% by weight of at least one ethylene/acrylic acid copolymer, 15 to 35% by weight of at least one water-soluble homopolymer or copolymer, and 20 to 40% by weight of at least one powdered superabsorbent polymer having an average particle size of less than 80 microns.

The tackifying resins can be selected from the same group of tackifying resins discussed above. The water-dispersible EVA waxes are selected from polyethylene waxes based on an ethylene/vinyl acetate copolymer having a vinyl acetate content of up to 15% and molecular weights of between 500 and about 10,000. Flexibilizing ethylene copolymers, particularly ethylene/alkyl acrylate copolymers having an alkyl acrylate proportion of 15 to 40% by weight, are suitable as hydrophobic matrix components for binding the powdered superabsorbent polymer. Longer-chain alkyl acrylic esters are particularly suitable as comonomers in this respect, particularly the C4-C12 alkyl acrylates.

The water-soluble homopolymer or copolymer can include polyethylene glycol, ethylene oxide/propylene oxide copolymers (either as block copolymers or as random copolymers having a predominate proportion of ethylene oxide), polyvinyl methyl ether, polyvinyl pyrrolidone, polyvinyl alcohol, and copolymers of such monomers with other olefinically unsaturated monomers. In embodiments, these water-soluble polymers have molecular weights of between 1000 and 20,000, they may be liquid at room temperature, or they may be solid and waxy in cases where higher molecular weights are used. Suitable powdered superabsorbsent polymers include those listed above.

In still another embodiment, the water-blocking adhesive 34 is comprised of 1% to 25% by weight of a block copolymer, 45% to 75% by weight of a powdered superabsorbent polymer, 15% to 40% by weight of a plasticizing oil, and optionally 1% to 5% by weight of a surfactant. Suitable block copolymers include linear and radial copolymer structures having the formula (A-B)x or A-B-A, where block A is a polyvinylarene block, block B is a poly (monoalkenyl) block, and x is an integer of at least 1. Suitable block A polyvinylarenes include, e.g., polystyrene, polyalpha-methylstyrene, polyvinyltoluene and combinations thereof. Suitable B blocks include, e.g., conjugated diene elastomers including, e.g., poly butadiene and polyisoprene, hydrogenated elastomers, ethylene/butylene (hydrogenated butadiene) and ethylene/propylene (hydrogenated isoprene), and combinations and mixtures thereof. Suitable powdered superabsorbent polymers include those listed above.

Suitable plasticizing oils include, e.g., hydrocarbon oils low in aromatic content, mineral oil. In a particular embodiment, the plasticizing oils are paraffinic or naphthenic. In some embodiments, the water-blocking adhesive 34 can also include tackifying agents, such as those listed above, up to 40% by weight.

In an embodiment, the water-blocking adhesive 34 includes at least one of sodium or potassium sodium acrylate or acrylamide copolymers, cross-linked carboxymethylcellulose, ethylene maleic anhydride copolymers, cross-linked polyethylene oxide, polyvinyl alcohol copolymers, or starch-grafted copolymers of polyacrylonitrile.

Referring to each of the above described water-blocking adhesive 34 compositions, in embodiments, the average particle size of the superabsorbent polymer powders is between 1 micron and 100 microns. Broadly, in embodiments, the average particle size of the superabsorbent polymer powder is less than or equal to 80 microns. In other embodiments, the average particle size of the superabsorbent polymer powders is less than or equal to 50 microns. In still other embodiments, the average particle size of the superabsorbent polymer powders is less than or equal to 38 microns, and in yet other embodiments, the average particle size of the superabsorbent polymer powders is less than or equal to 25 microns. Further, in embodiments, the average particle size of the superabsorbent polymer powders is greater than 1 micron, and in other embodiments, the average particle size of the superabsorbent polymer powders is greater than 10 microns. Additionally, in embodiments, less than 50% of the superabsorbent polymer powder particles have a maximum outer dimension ≥50 microns. In still other embodiments, less than 10% of the superabsorbent polymer powder particles have a maximum outer dimension ≥38 microns, and in yet other embodiments, less than 10% of the superabsorbent polymer powder particles have a maximum outer dimension ≥25 microns. Further, in embodiments, the superabsorbent polymer powders have particles that are spherical in shape.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
 a cable jacket comprising a jacket inner surface and a jacket outer surface, the jacket inner surface defining a central bore along a longitudinal axis of the optical fiber cable and the jacket outer surface defining an outermost surface of the optical fiber cable;
 at least one optical fiber disposed within the central bore;
 a buffer tube disposed within the central bore and surrounding the at least one optical fiber along the longitudinal axis, the buffer tube comprising a buffer tube inner surface and a buffer tube outer surface;
 an armor layer disposed between the jacket inner surface and the buffer tube outer surface; and
 a water-blocking adhesive disposed between and bonding the armor layer to the buffer tube outer surface, the water-blocking adhesive being a substantially uniform mixture comprising:
  a water-insoluble component; and
  a water-swellable component;
 wherein the water-blocking adhesive extends along at least a portion of the longitudinal axis of the optical fiber cable and at least partially around a circumference of the buffer tube such that the water-blocking adhesive extends between the armor layer and the buffer tube outer surface with n additional layers disposed therebetween.

2. The optical fiber cable of claim 1, wherein the armor layer comprises a plurality of corrugations.

3. The optical fiber cable of claim 2, wherein the water-blocking adhesive adheres to the armor layer and to the buffer tube outer surface and wherein the water-blocking adhesive fills and adheres to the plurality of the corrugations to create a mechanical interlock between the buffer tube and the armor layer.

4. The optical fiber cable of claim 3, wherein the mechanical interlock and adherence of the water-blocking adhesive to the armor layer and to the buffer tube outer surface constrains at least 12.8 MPa of contractive force.

5. The optical fiber cable of claim 1, wherein the water-blocking adhesive is continuous around the entire circumference of the buffer tube and along the longitudinal axis of the optical fiber cable.

6. The optical fiber cable of claim 1, wherein the water-blocking adhesive is discontinuous along the portion of the longitudinal axis along which the water-blocking adhesive extends.

7. The optical fiber cable of claim 1, wherein the water-blocking adhesive comprises one or more gaps between sections of water-blocking adhesive that are less than 3 meters in length.

8. The optical fiber cable of claim 1, wherein the buffer tube experiences a shrinkage of less than 75 millimeters after exposure to temperature cycling within the range of −40° C. and 70° C.

9. The optical fiber cable of claim 1, wherein the water-blocking adhesive comprises a thickness of up to 0.8 millimeters.

10. A method of preparing an optical fiber cable comprising the steps of:
providing an optical fiber cable core comprising a buffer tube having an inner surface and an outer surface, the inner surface defining a central bore along a longitudinal axis of the optical fiber cable core, and at least one optical fiber disposed within the central bore;
forming an armor layer partially around the optical fiber cable core;
depositing, as a liquid, a water-blocking adhesive on at least one of the cable core or the armor layer; and
closing the armor layer around the optical fiber cable core such that the armor layer is bonded to the optical fiber cable core by way of the water-blocking adhesive such that at least a portion of the water-blocking adhesive extends between the armor layer and the optical fiber cable core with no tape or film disposed in between.

11. The method of claim 10, further comprising the step of extruding a cable jacket around the armor layer after the closing step, wherein the cable jacket defines the outermost surface of the optical fiber cable.

12. The method of claim 10, wherein the depositing the water-blocking adhesive on at least one of the cable core or the armor layer comprises depositing the water-blocking adhesive on the armor layer prior to the forming step.

13. The method of claim 10, wherein depositing the water-blocking adhesive comprises depositing the water-blocking adhesive discontinuously on at least one of the cable core or the armor layer.

14. The method of claim 10, wherein the armor layer comprises a plurality of corrugations, and wherein further the water-blocking adhesive is deposited on the armor layer such that the water-blocking adhesive conforms to the corrugations.

15. The method of claim 10, wherein the forming step further comprises forming the armor layer into a U-shape at least partially around the optical fiber cable core.

16. The method of claim 10, wherein the water-blocking adhesive is a substantially uniform mixture that comprises a water-swellable component and a water-insoluble component.

17. An optical fiber cable comprising:
a jacket structure comprising a cable jacket and optionally an armor layer surrounded by the cable jacket, the jacket structure defining a central bore along a longitudinal axis of the optical fiber cable;
at least one optical fiber disposed within the central bore;
a first layer disposed between the at least one optical fiber and the jacket structure, the first layer comprising at least one of a buffer tube or a foamed thermoplastic elastomer layer that surrounds the at least one optical fiber;
a second layer disposed between the first layer and the jacket structure;
wherein the second layer is bonded to and in contact with the first layer and one of the cable jacket or the armor layer such that the second layer adheres the first layer to the jacket structure; and
wherein the second layer is formed of a substantially uniform mixture that comprises a water-swellable component and that is configured to absorb water that enters through the jacket structure.

18. The optical fiber cable of claim 17, wherein the cable jacket comprises an inner surface and an outer surface and wherein the jacket structure further comprises the armor layer disposed on the inner surface of the cable jacket.

19. The optical fiber cable of claim 18, wherein the second layer adheres the first layer to the armor layer such that the first layer adheres to the jacket structure by way of the armor layer.

20. The optical fiber cable of claim 19, wherein the armor layer comprises a plurality of corrugations, wherein further the second layer is applied to the armor layer such that the second layer is substantially conformal to the plurality of corrugations.

* * * * *